United States Patent Office 3,152,137
Patented Oct. 6, 1964

3,152,137
PROCESS FOR PREPARING 2:2'-DIPYRIDYL
George Henry Lang, Randal George Arthur New, and John Martin Thompson, all of Manchester, England, assignors to Imperial Chemical Industries Limited, London, England, a corporation of Great Britain
No Drawing. Filed Apr. 14, 1961, Ser. No. 102,949
Claims priority, application Great Britain, Apr. 26, 1960, 14,608/60
5 Claims. (Cl. 260—296)

This invention relates to an improved process for the preparation of nickel catalysts.

Catalysts suitable for hydrogenation and dehydrogenation reactions may be prepared by the action of aqueous alkali on nickel/aluminum alloys, the catalyst being obtained in the form of an aqueous suspension of finely divided nickel. For use in reactions in which the presence of water would be undesirable it is customary to remove the water by washing with a water-miscible liquid resistant to hydrogenation, such as methanol, the catalyst being then used in suspension in the liquid.

An alternative method of removing the water from the catalyst is by heating the aqueous paste of the catalyst under reduced pressure. This procedure is not suitable for operation on the manufacturing scale because evolution of hydrogen from the catalyst can occur in an explosive manner and furthermore the dry catalyst so obtained is pyrophoric and consequently difficult to handle. For some purposes, however, the catalyst prepared by methanol washing is unsatisfactory in performance, for example in the preparation of 2:2'-dipyridyl from pyridine, and it has hitherto been necessary then to adapt the unattractive procedure of drying by heating under reduced pressure.

We have now found that the failure of the methanol washed catalyst is due to deactivation of the catalyst by methanol. In this respect methanol is far more harmful than water as is shown by the fact that 2% of methanol in the pyridine used for conversion to 2:2'-dipyridyl will reduce the yield of the latter to about ⅙, while 2% of water will reduce the yield by only about 25%. In accordance with this we find that the water can be readily removed from the catalyst without introduction of catalyst poisons by washing with pyridine and that such a catalyst is then satisfactory for use for example in the manufacture of 2:2'-dipyridyl from pyridine.

According to our invention therefore we provide a process for the preparation of water-free nickel catalyst from a suspension of said nickel catalyst in an aqueous medium which comprises the addition of pyridine to the said suspension followed by separation of the nickel catalyst from the aqueous pyridine.

The process of the invention may be carried out in any conventional manner, for example by mixing the aqueous catalyst suspension with pyridine and then removing the main part of the aqueous pyridine from the catalyst by filtration or decantation, the procedure being repeated until the amount of water has been reduced to such an extent that it will not interfere with use of the catalyst.

It is particularly convenient when the catalyst is to be used in the preparation of 2:2'-dipyridyl from pyridine to carry out the washing to remove the last traces of water with the condensate from the boiling pyridine, a fractionating column being used to separate the water continuously as lower boiling pyridine/water azeotrope. The catalyst prepared by the process of our invention is of especial value in the manufacture of 2:2'-dipyridyl and the manufacture of this compound using this catalyst forms a further feature of our invention.

By the use of the process of our invention nickel catalyst free from water and of high activity is obtained by a procedure which is easy to carry out on the manufacturing scale, the difficulties associated with the process involving drying by heating under reduced pressure and the subsequent handling of a dry pyrophoric powder being obviated.

The invention is illustrated but not limited by the following examples in which all parts and percentages are by weight unless otherwise stated.

Example 1

62.5 parts of a commercial powdered nickel/aluminum alloy (containing approximately 50% of nickel and 50% of aluminum) is treated with caustic soda solution by the technique described for the preparation of W7 catalyst in Organic Syntheses, 1959, volume 25, page 24, to give an aqueous paste of nickel. The aqueous paste so obtained is placed in the glass thimble (fitted with a sintered glass filtering disc in the bottom to retain the catalyst) of a Soxhlet extraction apparatus, and the siphon tube is cut off at the top so that in operation a layer of pyridine is retained above the top of the catalyst bed. Water is removed from the aqueous paste either by decantation or by applying slight suction to the siphon tube (without allowing the catalyst to become dry), and the residual catalyst paste is washed 4 times with 25 parts each time of dry pyridine, the pyridine-water washings being removed each time by suction. Then the thimble is placed within the outer jacket of the Soxhlet apparatus, which is arranged so that the upgoing vapour surrounds the thimble thus keeping it hot, fitted to a round-bottomed flask, and surmounted by a fractionating column and a reflux condenser. 100 parts of dry pyridine are charged to the thimble and 400 parts of dry pyridine are placed in the flask, which is then heated until the pyridine boils. Pyridine, initially as the water azeotrope, is removed from the top of the column, the reflux return from this being passed to the thimble to complete the washing of the catalyst. After the removal of 33 parts of aqueous pyridine, the fractionating column is removed and the boiling continued, the 2:2'-dipyridyl formed in the thimble being collected in the flask. The flow rate of the pyridine over the catalyst is adjusted to about 270 parts per hour, i.e. about 9 parts per hour per part of catalyst. The experiment is continued for 14½ hours and the pyridine allowed to drain from the thimble to give in the flask a pyridine solution containing 51.1 parts of 2:2'-dipyridyl, which is isolated in the form of crystals, melting at 72° C., by distillation at a temperature between 134 and 135° C. under a pressure of 11 mm. of mercury. This rate of formation is equal to 13.3 parts of 2:2'-dipyridyl per hour per 100 parts of nickel.

The drying technique described above represents a convenient method of operation. Alternatively the removal of water from the catalyst can be conducted entirely in the Soxhlet apparatus using the hot reflux return from the column to wash the catalyst, the water then being removed from the top of the column as before.

Example 2

62.5 parts of commercial powdered nickel/aluminum alloy (50/50%) is converted as described in Example 1 to an aqueous paste of nickel catalyst, which is then placed in a flask fitted with a stirrer, a fractionating column, and a dropping funnel. 150 parts of pyridine are then added to the catalyst and the whole heated to the boil with stirring. The pyridine/water azeotrope is removed from the top of the column whilst simultaneously fresh dry pyridine is added to replace it through the dropping funnel. After 1 hour, during which time 156 parts of pyridine are added and 198 parts of aqueous pyridine distillate are collected, the temperature at the top of the column reaches the boiling point of pyridine (115° C.). The fractionating column is now replaced by a reflux condenser and the mixture heated for 14 hours under reflux with stirring. The catalyst is removed by filtration and leaves a filtrate containing 17.1 parts of 2:2'-dipyridyl, i.e. a rate of formation of dipyridyl of 3.9 parts per hour per 100 parts of nickel.

For comparison a similar experiment is carried out in which the nickel catalyst is dried as described by Sasse in the Journal of the Chemical Society, 1956, page 616, by heating at 100° C. under a pressure of 15–20 mm. of mercury. After a reaction time of 14 hours 9.1 parts of dipyridyl are obtained equivalent to a yield of 2.01 parts per hour per 100 parts of nickel.

What we claim is:

1. A process for the preparation of 2:2'-dipyridyl which comprises the steps of adding pyridine to an aqueous suspension of nickel catalyst, separating aqueous pyridine from said catalyst, and then contacting the said catalyst with pyridine at its boiling point.

2. A process for preparing 2:2'-dipyridyl which comprises adding dry pyridine to an aqueous paste of nickel catalyst whereby water from said paste is taken up by said pyridine; separating the resulting aqueous pyridine from said catalyst; repeating said addition and separation steps until said catalyst is essentially water-free and thereafter heating a mixture of said water-free catalyst with pyridine under reflux to form said 2:2'-dipyridyl.

3. A process as claimed in claim 1 wherein the aqueous pyridine is separated from said catalyst by filtration.

4. A process as claimed in claim 1 wherein the aqueous pyridine is separated from said catalyst by decantation.

5. A process as claimed in claim 1 wherein the aqueous pyridine after separation from the nickel catalyst is distilled, the water in said aqueous pyridine being separated as pyridine/water azeotrope, and the dry pyridine so obtained being used to remove further water from the nickel catalyst suspension.

References Cited in the file of this patent

UNITED STATES PATENTS

| | | |
|---|---|---|
| 2,950,260 | Rosenbaum et al. | Aug. 23, 1960 |
| 2,962,502 | Freeman et al. | Nov. 29, 1960 |
| 2,992,224 | Cislak | July 11, 1961 |
| 3,032,515 | Hinsvark | May 1, 1962 |
| 3,053,846 | Varcoe | Sept. 11, 1962 |

OTHER REFERENCES

Badger and Sassee: "J. Chem. Soc." (1956), pp. 616–20.